(12) United States Patent
Min et al.

(10) Patent No.: US 8,994,988 B2
(45) Date of Patent: Mar. 31, 2015

(54) IMAGE FORMING APPARATUS, HOST APPARATUS, AND PRINT METHOD THEREOF

(75) Inventors: Sun-ki Min, Suwon-si (KR); Do-hyung Kim, Seoul (KR); Tae-joon Chung, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 393 days.

(21) Appl. No.: 13/151,426

(22) Filed: Jun. 2, 2011

(65) Prior Publication Data

US 2012/0092705 A1    Apr. 19, 2012

(30) Foreign Application Priority Data

Oct. 18, 2010  (KR) .................. 10-2010-0101481

(51) Int. Cl.
  *G06F 3/12* (2006.01)
  *G06F 3/14* (2006.01)

(52) U.S. Cl.
  CPC ............ *G06F 3/1423* (2013.01); *G06F 3/1205* (2013.01); *G06F 3/1252* (2013.01); *G06F 3/1253* (2013.01); *G06F 3/1268* (2013.01); *G06F 3/1284* (2013.01); *G06F 3/1208* (2013.01); *G06F 3/1204* (2013.01); *G09G 2340/04* (2013.01); *G09G 2340/0492* (2013.01); *G09G 2370/20* (2013.01)
  USPC ............................. 358/1.15; 345/1.1; 345/1.2

(58) Field of Classification Search
  None
  See application file for complete search history.

(56) References Cited

U.S. PATENT DOCUMENTS

| | | | |
|---|---|---|---|
| 6,522,309 B1* | 2/2003 | Weber | 345/1.1 |
| 2006/0288304 A1* | 12/2006 | Nomoto et al. | 715/781 |
| 2007/0097425 A1* | 5/2007 | Kajita et al. | 358/1.15 |
| 2007/0177197 A1* | 8/2007 | Murahashi et al. | 358/1.15 |
| 2007/0201070 A1* | 8/2007 | Tomizuka et al. | 358/1.13 |
| 2007/0291338 A1* | 12/2007 | Williams et al. | 358/537 |
| 2007/0296992 A1* | 12/2007 | Tanaka | 358/1.13 |
| 2009/0091786 A1* | 4/2009 | Yamaguchi et al. | 358/1.15 |
| 2009/0116058 A1* | 5/2009 | Yoshimura | 358/1.15 |

* cited by examiner

*Primary Examiner* — Fred Guillermety
*Assistant Examiner* — Keara Harris
(74) *Attorney, Agent, or Firm* — Staas & Halsey LLP

(57) ABSTRACT

Disclosed are an image forming apparatus, a host apparatus, and a print method thereof. A method includes receiving a one touch print command from a print button provided in the image forming apparatus to print an image of at least one monitor among a plurality of monitors of a host apparatus connected to the image forming apparatus. With this configuration, high quality output products may be provided without any image distortion due to a difference in resolution upon receiving a one touch print command in the multi monitor environment.

29 Claims, 11 Drawing Sheets

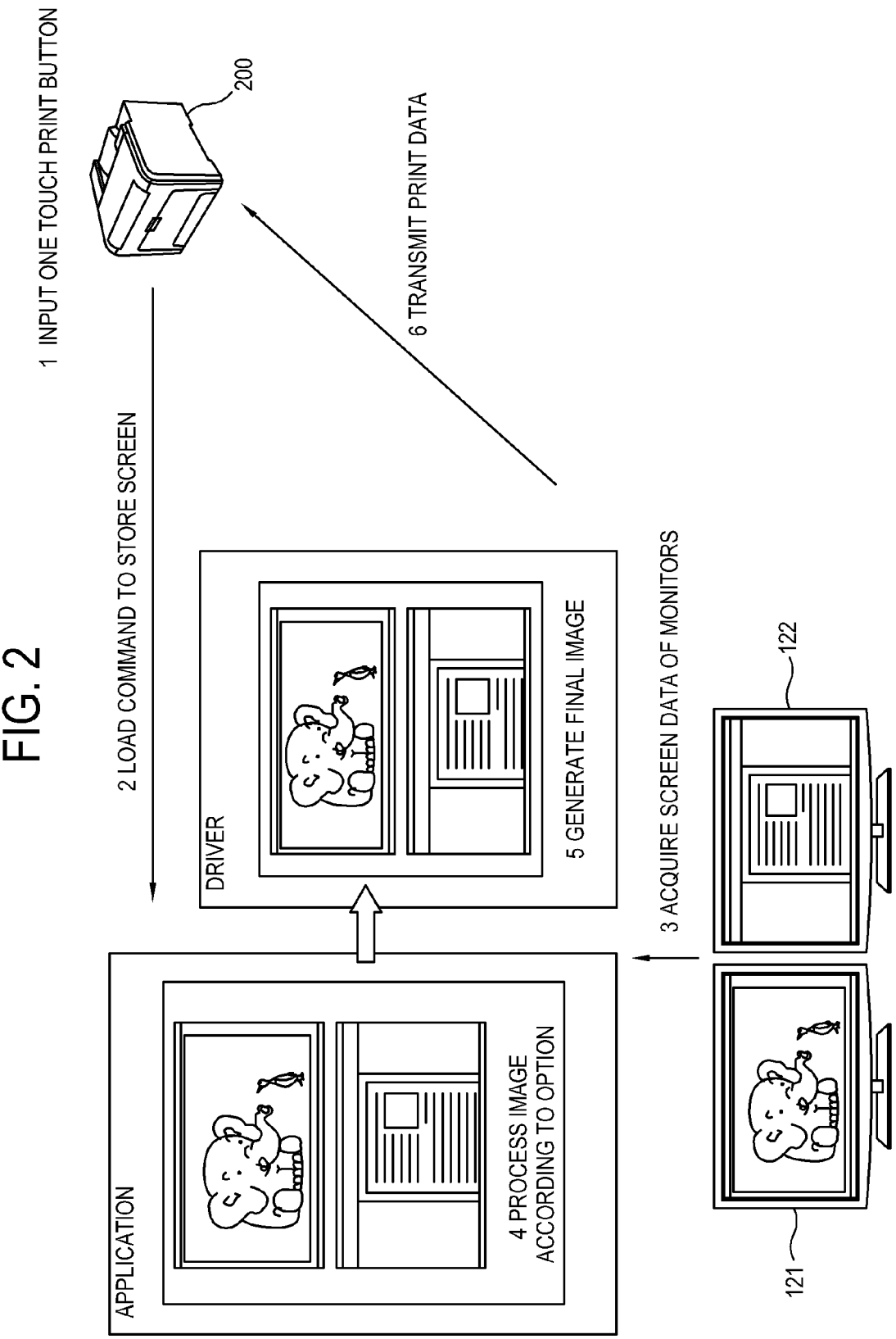

IMAGE FORMING APPARATUS, HOST APPARATUS, AND PRINT METHOD THEREOF

CROSS-REFERENCE TO RELATED APPLICATIONS

This application claims the benefit of priority under 35 U.S.C. §119 from Korean Patent Application No. 10-2010-0101481, filed on Oct. 18, 2010 in the Korean Intellectual Property Office, the disclosure of which is incorporated herein by reference in its entirety.

BACKGROUND OF THE INVENTION

1. Field of the Invention

Apparatuses and methods consistent with exemplary embodiments relate to an image forming apparatus, a host apparatus, and a print method thereof, and more particularly, to an image forming apparatus, a host apparatus, and a print method thereof which performs a one touch print to print data of a monitor screen as displayed in a monitor.

2. Description of the Related Art

In general, a user may execute a predetermined program in a host apparatus such as a personal computer (PC), and may select a print menu from the executed program to thereby print data displayed on a screen of the host apparatus.

The host apparatus prints data according to a setting value of the executed program or a printer driver, and thus the image printed on a print medium may not be equal to the image displayed on the screen.

For example, if a user prints a web page on a web browser, part of the image displayed on the monitor may be cut or omitted or the image may be divided and printed in a plurality of pages.

Accordingly, a user may have to adjust each setting value from the print menu and confirm an output image according to the adjusted setting value through a preview to print the screen of the monitor as displayed therein.

One touch print function is to print a screen of a monitor as displayed, in a single page without any above setting process. An image forming apparatus which supports the one touch print function may have a one touch print button corresponding to such function.

Then, a user may manipulate the one touch print button and print the screen as displayed in the monitor without any additional print setting process.

In line with the development of PC technology, many users enjoy the multi-monitor environment including dual or more monitors.

However, in the multi-monitor environment, there is a plurality of data of monitor screens and a plurality of images may be distorted when such images are printed in one page.

More specifically, if the multi-monitors have different resolutions, the image of a screen having a lower resolution may be distorted, and a space due to the difference of resolutions of monitors may be printed in black, which degrades the quality of the output document.

As the plurality of screens is printed in one page regardless of a user's intent, usability also decreases.

SUMMARY OF THE INVENTION

The present general inventive concept is directed to an apparatus and method to print image data from one or more monitors using a one touch print function.

Additional aspects and advantages of the present general inventive concept will be set forth in part in the description which follows and, in part, will be obvious from the description, or may be learned by practice of the general inventive concept.

Features and/or utilities of the present general inventive concept may be realized by a print method of a host apparatus connected to a plurality of monitors and an image forming apparatus supporting a one touch print function to print data displayed on a screen of at least one of the plurality of monitors, the print method including setting an option of the one touch print function to print the plurality of monitor screens, receiving a one touch print command by manipulating a one touch print button provided in the image forming apparatus, generating at least one image buffer in a memory to store therein at least one image data among a plurality of images corresponding to the plurality of monitor screens according to the set option, storing image data of the monitor screen in at least one generated image buffer, generating print data by processing the stored image data corresponding to the option, and the storing the image data comprising storing image data of a single monitor screen in a single image buffer.

The option may be set to print an image of a screen of one of the plurality of monitors or print a plurality of images corresponding to screens of all of the plurality of monitors.

The generating the image buffer may include generating a plurality of image buffers in the memory corresponding to the plurality of monitors, and the storing the image data may include storing the screen data of the plurality of monitors in the plurality of image buffers if the option is set to print the images of all of the plurality of monitors.

The option may include at least one of printing one monitor screen in one page, printing only a screen where a mouse cursor is located, printing screens in one page by N-Up, printing consecutive images in one page, printing a main monitor screen only, and printing a sub monitor screen only.

The print method may further include displaying a user interface (UI) to select the option.

The generating the print data may include scaling the image data corresponding to a size of a print medium according to the option.

The scaling may include scaling the plurality of images corresponding to the plurality of monitor screens into a size of 1/n if the option is set to print the screens in one page by N-Up (wherein n means the number of the plurality of monitors).

The print method may further include adjusting the image to print a space in white if the option is set to print consecutive images in one page.

The generating the print data may further include rotating the image data according to the option.

The storing the image data may include identifying coordinates of a mouse pointer if the option is set to print only the screen where the mouse cursor is located, and storing image data of a monitor screen where the identified coordinates are located, in the image buffer.

The one touch print function prints data of a monitor screen as seen in the monitor identically.

Features and/or utilities of the present general inventive concept may also be realized by an image forming apparatus which is connected to a host apparatus comprising a plurality of monitors and supports a one touch print function to print data of a monitor screen of the host apparatus as seen in the monitor, the image forming apparatus including an image forming unit which performs a print operation, a communication unit which communicates with the host apparatus, a user input unit which comprises a one touch print button to receive a one touch print command and sets an option of the one touch print function to print the plurality of monitor screens, and a controller which controls the communication unit to generate and transmit to the host apparatus the one touch print command according to the set option and to receive print data generated according to the option from the host apparatus, and which controls the image forming unit to print the received print data if an input of the one touch print button is received.

The one touch print function prints data of a monitor screen as seen in the monitor identically.

Features and/or utilities of the present general inventive concept may also be realized by a host apparatus which is connected to an image forming apparatus supporting a one touch print function to print data of a monitor screen as seen in the monitor and is located in a multi-monitor environment where a plurality of monitors is provided, the host apparatus including a user input unit which is provided to set an option of the one touch print function to print the plurality of monitor screens, a communication unit which receives a one touch print command generated by manipulating a one touch print button provided in the image forming apparatus, a memory which comprises at least one image buffer to store therein an image of the monitor screen, an image processor which generates print data, and a controller which generates at least one image buffer in the memory to store therein at least one image data among a plurality of images corresponding to the plurality of monitor screens according to the set option, stores image data of the monitor screens in the at least one generated image buffer, and controls the image processor to process the stored image data corresponding to the option and to generate print data if a one touch print command is received through the communication unit, the single image buffer storing therein image data of a single monitor screen.

The option may be set to print an image of one of the plurality of monitor screens or to print a plurality of images corresponding to all of the plurality of monitor screens.

The controller may generate a plurality of image buffers in the memory corresponding to the plurality of monitors and may store data of the plurality of monitor screens in the plurality of image buffers if the option is set to print the plurality of images corresponding to all of the plurality of monitor screens.

The host apparatus may further include a display unit which displays thereon a user interface to select the option, and the option may include at least one of printing one monitor screen in one page, printing only a screen where a mouse cursor is located, printing screens in one page by N-Up, printing consecutive images in one page, printing a main monitor screen only, and printing a sub monitor screen only.

The image processor may scale the image data corresponding to a size of a print medium according to the option.

The image processor may scale the plurality of images corresponding to the plurality of monitor screens into a size of 1/n if the option is set to print screens in one page by N-Up (wherein n means the number of a plurality of monitors).

The image processor may adjust the image to print a space in a white color if the option is set to print consecutive images in one page.

The image processor may rotate the image data according to the option.

The controller may identify coordinates of a mouse pointer and store in an image buffer image data of a monitor screen where the identified coordinates are located if the option is set to print only a screen where a mouse cursor is located.

Features and/or utilities of the present general inventive concept may also be realized by an image forming apparatus which is connected to a host apparatus comprising a plurality of monitors and supports a one touch print function to print data of a monitor screen of the host apparatus as seen in the monitor, the image forming apparatus including an image forming unit which performs a print operation, a communication unit which communicates with the host apparatus, a user input unit which comprises a one touch print button to receive a one touch print command, and a controller which generates and transmits the one touch print command to the host apparatus, controls the communication unit to receive print data comprising data of one of the plurality of monitor screens from the host apparatus, and controls the image forming unit to print the received print data if an input of the one touch print button is received.

Features and/or utilities of the present general inventive concept may be realized by an image forming apparatus, including an image forming unit to generate an image onto a printing medium, a communication unit including a port to communicate with a host device including at least one monitor, and a user interface to receive user input to print with the image forming unit a screen of the at least one monitor.

The at least one monitor may include a plurality of monitors, and the user input to print a screen of the at least one monitor may include a command to print a plurality of screens corresponding to all of the plurality of monitors.

The command may be one of a command to print the plurality of screens onto a same sheet of the printing medium and a command to print the plurality of screens on different sheets of the printing medium.

The user interface may include a button to generate a command to print the screen of the at least one monitor as seen in the monitor identically.

Features and/or utilities of the present general inventive concept may also be realized by a host apparatus, including at least one monitor to display an image, at least one communication unit including a port to connect to a printing device, and a controller to receive from the printing device via the at least one communication unit a command to print a screen of the at least one monitor, to generate print data corresponding to the screen of the at least one monitor, and to transmit the print data to the printing device via the at least one communication unit.

The at least one monitor may include a plurality of monitors, and the controller may determine, upon receiving the command to print the screen of the at least one monitor, whether to print the screen of only one screen of the plurality of monitors or to print the screens of all of the plurality of monitors.

The host apparatus may further include a user input unit to receive setting information, and the controller may determine whether to print the screen of only one of the plurality of monitors or to print the screens of all of the plurality of monitors based upon the received setting information.

When the controller determines whether to print the screen of only one of the plurality of monitors, the controller may further determine, based upon the received setting information, whether to print the screen of a predetermined monitor or to print the screen of a monitor corresponding to a location of a computer mouse icon.

When the controller determines whether to print the screens of the plurality of monitors, the controller may further determine, based upon the received setting information, whether to print the screens onto only one sheet of the printing medium or onto a plurality of sheets of the printing medium.

The host apparatus may further include memory, and the controller may partition only one image buffer in memory to store data corresponding to only one screen of the plurality of monitors when the controller determines to print only one screen, and the controller may partition a plurality of image buffers in memory when the controller determines to print screens of all of the plurality of monitors.

Features and/or utilities of the present general inventive concept may also be realized by a print system, including a host device to display an image onto at least one screen of at least one monitor, and an image forming apparatus connected to the host device via a port and including at least one user input to generate a print command to print the at least one screen of the at least one monitor.

The at least one monitor may include a plurality of monitors, and the host device may include a controller to determine, upon receiving the print command, whether to print only one screen from among the screens of the plurality of monitors or to print all the screens of the plurality of monitors.

Features and/or utilities of the present general inventive concept may also be realized by a method of printing an image with an image forming apparatus connected via a port to a host apparatus having at least one monitor, the method including receiving a user input at the image forming apparatus to print an image of a screen of the at least one monitor, transmitting from the host apparatus print data corresponding to the at least one monitor, and printing with the image forming apparatus the print data.

The at least one monitor may include a plurality of monitors, and the host apparatus may determine, upon receiving a command to generate the print data, whether to generate print data corresponding to only one screen of the plurality of monitors or to generate print data corresponding to each screen of the plurality of monitors.

When the host apparatus determines to generate the print data corresponding to only one screen of the plurality of monitors, the host apparatus may further determine whether to generate print data corresponding to a predetermined screen of the plurality of monitors or to generate print data corresponding to a screen having a computer mouse icon. When the host apparatus determines to generate the print data corresponding to each screen of the plurality of monitors, the host apparatus may further determine whether to generate print data to control the image forming apparatus to generate the print data of each screen onto a same sheet of a printing medium or onto separate sheets of the printing medium.

Features and/or utilities of the present general inventive concept may also be realized by a method of printing an image, the method including receiving a user input to generate print data, transmitting to a host apparatus including a plurality of monitors a command to generate the print data corresponding to at least one screen of the plurality of monitors, receiving from the host apparatus the print data, and printing on a printing medium an image corresponding to the generated print data.

Features and/or utilities of the present general inventive concept may also be realized by a method of printing an image, the method including receiving from an image forming apparatus a command to generate print data corresponding to at least one screen of at least two monitors of a host apparatus, determining whether to generate print data corresponding to only one screen of the plurality of monitors or corresponding to each screen of the plurality of monitors, generating the print data, and transmitting the print data to the image forming apparatus.

BRIEF DESCRIPTION OF THE DRAWINGS

The above and/or other aspects of the general inventive concept will become apparent and more readily appreciated from the following description of the exemplary embodiments, taken in conjunction with the accompanying drawings, in which:

FIG. 2 illustrates a print process of screens of multi-monitors by a one touch print function according to the exemplary embodiment;

DETAILED DESCRIPTION OF THE EMBODIMENTS

Figure 1A:
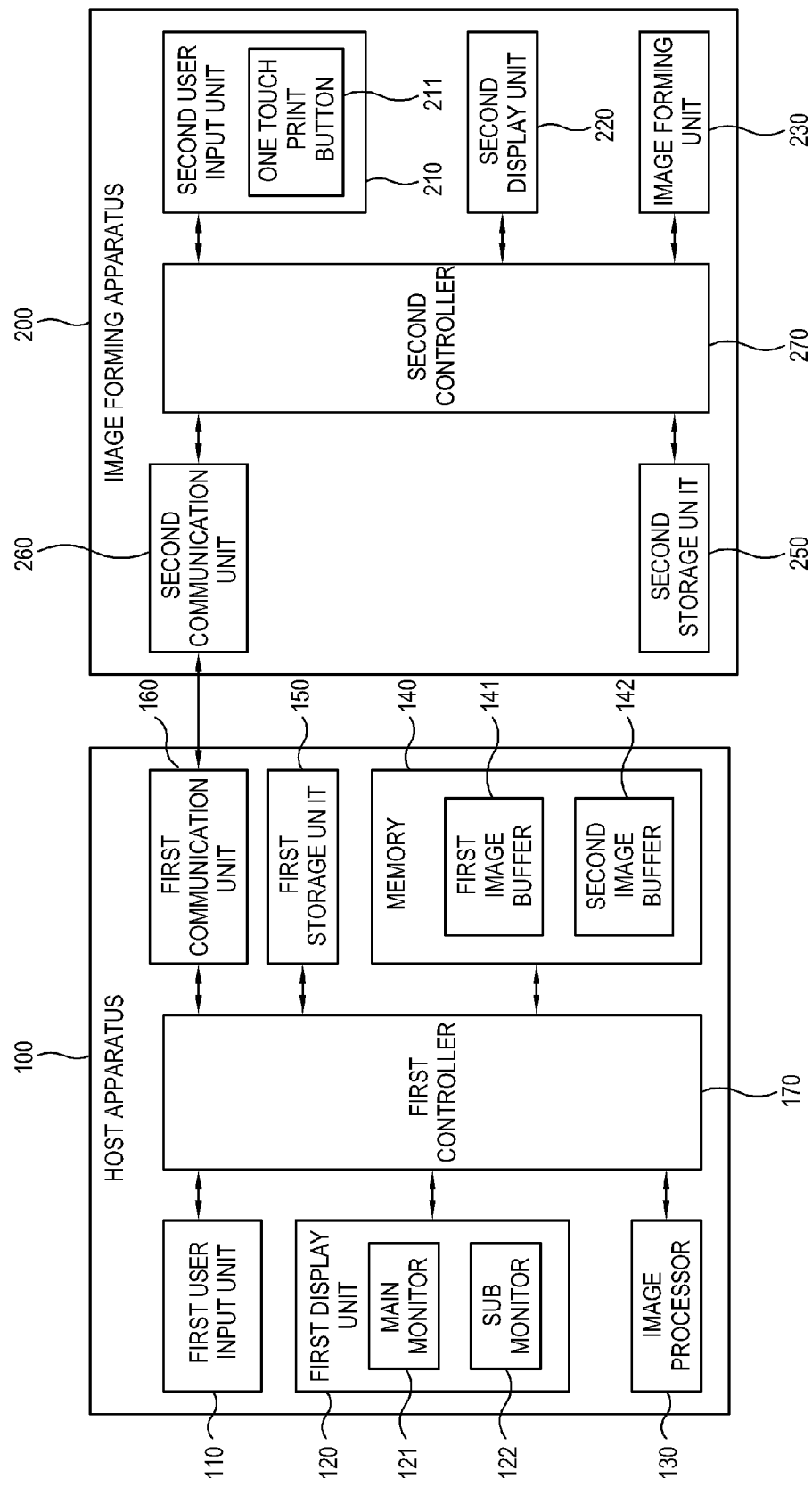
FIG. 1A is a block diagram of a host apparatus and an image forming apparatus according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1A is a block diagram of a host apparatus 100 and an image forming apparatus 200 according to an exemplary embodiment.

The host apparatus 100 may include a PC which has a plurality of monitors as a display unit 120 supporting a multi-monitor environment including dual or more monitors. The host apparatus 100 may be connected to the image forming apparatus 200 through a wired/wireless network and perform a data communication with at least one image forming apparatus 200 through a communication interface such as a universal serial bus (USB) device.

The image forming apparatus 200 may include a printer, a photocopier, a facsimile, or a multifunction peripheral having at least two functions. A one touch print button 211 is provided as a user input unit 210 of the image forming apparatus 200 and supports a one touch print function to print a screen of a monitor of the host apparatus 100.

The host apparatus 100 includes a first user input unit 110, a first display unit 120, an image processor 130, a memory 140, a first storage unit 150, a first communication unit 160, and a first controller 170.

The first user input unit 110 receives user's various inputs. More specifically, a user may set an option for the one touch print function to print screens of a plurality of monitors through the first user input unit 110. The first user input 110 may include, for example, a keyboard, keypad, touch screen, or any other device to receive input from a user. A user may set the option to print a screen of one of a plurality of monitors or to print a plurality of images corresponding to screens of all of the plurality of monitors.

More specifically, the option for printing an image of a screen of one of the plurality of monitors includes at least one of "print a screen only where a mouse cursor is located,"

"print a main monitor only," and "print a sub monitor only." The option for printing the plurality of images corresponding to the screens of all of the plurality of monitors may include at least one of "print a screen of one single monitor in one page," "print screens in one page by N-Up," and "print consecutive images in one single page".

The first user input unit 110 may receive a user's input to install an application supporting a one touch print function. The installed application generates, and transmits to a printer driver, image data according to the option of the one touch print. The printer driver converts the image data into print data in a predetermined print language and transmits such print data to the image forming apparatus 200.

The host apparatus 100 may be provided to generate the image data by the one touch print function from the printer driver instead of an additional application.

A user may perform a log-in to the printer driver or the application through the first user input unit 110. The first user input unit 110 receives user authentication information from a user. The first controller 170 authenticates a user by using the input user authentication information.

The first user input unit 110 includes a keyboard, a mouse, a touch panel or the like as an input device of the host apparatus 100, and may include a graphic user interface (GUI) generated by an execution of software such as a driver, an additional application or a solution and displayed on the first display unit 120 to be selected by a user. For example, the first user input unit 110 according to an exemplary embodiment includes UIs 40, 50, and 60 related to setting the one touch print option as in FIGS. 4 to 6.

The first display unit 120 is provided as a monitor which may include a liquid crystal display (LCD) to display a screen and a driver to drive the LCD (not shown).

FIG. 2 illustrates a print process of screens of a plurality of monitors by the one touch print function according to an exemplary embodiment.

The first display unit 120 includes a main monitor 121 and a sub monitor 122 as a plurality of monitors. As shown therein, the main monitor 121 and the sub monitor 122 may display thereon different screens.

The host apparatus 100 in FIGS. 1 and 2 includes a dual monitor having two monitors 121 and 122, but not limited thereto. Alternatively, the host apparatus 100 may include three or more of monitors.

The host apparatus 100 which is provided in a multi-monitor environment may have one of the plurality of monitors set as the main monitor 121 and the remaining as the sub monitor 122.

The image processor 130 generates print data in a predetermined print language by processing the image data according to a print command. More specifically, upon receiving a one touch print command, the image processor 130 acquires image data corresponding to a screen of at least one of the main monitor 121 and the sub monitor 122 according to the one touch print option and stores the image data in the corresponding image buffers 141 and 142, and generates print data in a predetermined print language by processing the stored image data.

Figure 3:
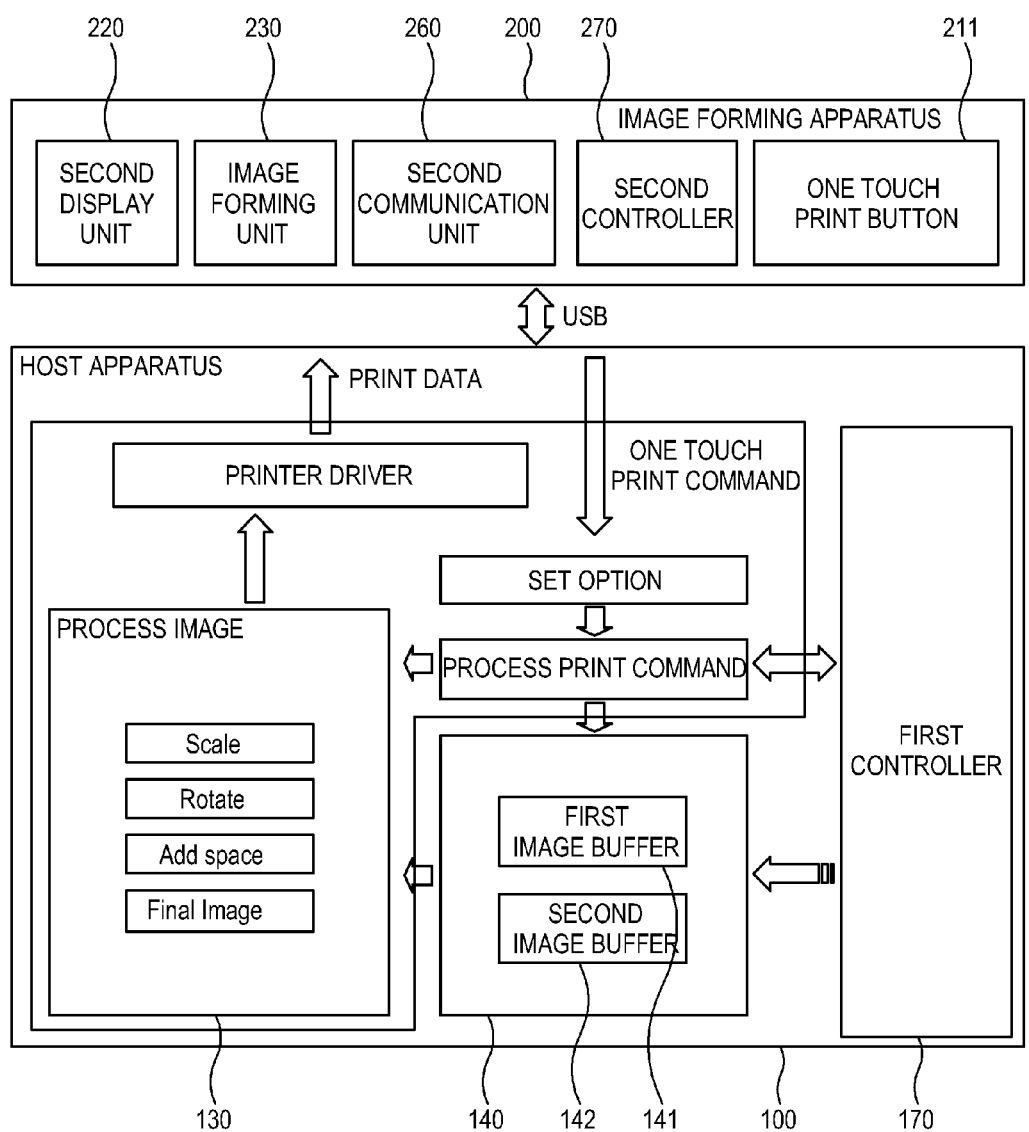
FIG. 3 illustrates processing and generating print data according to the exemplary embodiment.

FIG. 3 illustrates processing and generating the print data according to an exemplary embodiment.

The image processor 130 may include an application to process an image according to the one touch print option, and a print driver to convert the image processed by the application into print data in a predetermined print language.

The image processing may include parsing the one touch print option, scaling, rotating, or adding space to a screen image, and generating a final image.

In addition to the one touch print function, the image processor 130 may include a printer driver to process an image and generate image data without an additional application.

The memory 140 includes an image buffer to temporarily store therein image data of the screen of the monitor acquired by the one touch print command, and is provided as a random access memory (RAM).

Returning to FIG. 1, the memory 140 includes a first image buffer 141 to store therein a screen image of the main monitor 121, and a second image buffer 142 to store therein a screen image of the sub monitor 122. If the second display unit 120 includes three or more of monitors, the memory 140 may further include three or more of image buffers to store therein screen images corresponding to the monitors.

The first and second image buffers 141 and 142 may be storage areas temporarily generated within the memory 140 upon the reception of the one touch print command. If the one touch print option includes an option to print a screen image of one of the plurality of monitors, only one single image buffer may be generated.

The first storage unit 150 stores therein option information set for the one touch print, information of software installed in the host apparatus 100, print data generated by a user's command and transmitted to the image forming apparatus 200, user authentication information for each user account, and usage authorization information.

The first storage unit 150 may be an internal storage medium such as a hard disk drive (HDD) provided in the host apparatus 100 or an external or portable storage medium such as a USB device, or a memory card (memory stick, CF card or MMC).

The first communication unit 160 performs a data communication with the outside, or with devices external to the host apparatus 100. The first communication unit 160 may include a wired/wireless communication module connected to the image forming apparatus 200 through a network by a predetermined protocol, or a communication interface such as a USB device.

The first communication unit 160 receives the one touch print command from the image forming apparatus 200, and transmits the print data generated by the image processor 140 to the image forming apparatus 200.

More specifically, the first communication unit 160 may transmit a signal, by a control of the first controller 170, on a regular basis to the image forming apparatus 200 to identify whether an input of the one touch print button 211 (or, an auto print button) provided in the image forming apparatus 200 is received.

The image forming apparatus 200 receives the signal from the host apparatus 100 and identifies the input/non-input of the one touch print button 211 by an interrupt and returns the value. If the input of the one touch print button 211 is identified by the returned value, the corresponding command is transmitted to the host apparatus 100.

The first communication unit 160 receives the one touch print command from the image forming apparatus 100, and transmits the generated print data to the image forming apparatus 200 corresponding to the received print command.

The first controller 170 controls the host apparatus 100 as a whole.

More specifically, the first controller 170 controls the first communication unit 160 to transmit the signal on a regular basis to the image forming apparatus 200 to identify whether the input of the one touch print button 211 of the image forming apparatus 200 is received and to monitor on a regular basis whether the one touch print command is received from the image forming apparatus 200.

As in FIG. 2, upon receiving the one touch print command, i.e., the command to store the monitor screen from the host apparatus 200, the first controller 170 of the host apparatus 100 controls the image processor 140 to acquire screen data of the plurality of monitors 121 and 122, to process the acquired image according to the option and to generate the print data in a print language with the processed image.

The first controller 170 stores the acquired screen data in the first image buffer 141 and the second image buffer 142 of the memory 140, respectively. That is, a single image buffer stores therein the screen data of a single memory.

The first controller 170 may request and receive a frame data size of a plurality of monitors consequentially according to the one touch print command, and distribute a memory corresponding to the size of the data returned to the memory 130, and generate an image buffer.

Accordingly, if the one touch print option includes print a single monitor only, a single image buffer is generated within the memory 140 and stores the screen data of the monitor which is output. If the one touch print option includes print a plurality of monitor screens, image buffers are generated within the memory 140 corresponding to the number of monitors and respectively store therein the screen data of the monitors which are output.

The first controller 170 generates the image buffer to store therein the screen data according to the option for the one touch print function with respect to the plurality of monitors, and controls the image processor 130 to generate the print data by processing the stored image.

The one touch print option may be set by executing the application or the printer driver of the host apparatus 100.

Figure 4:
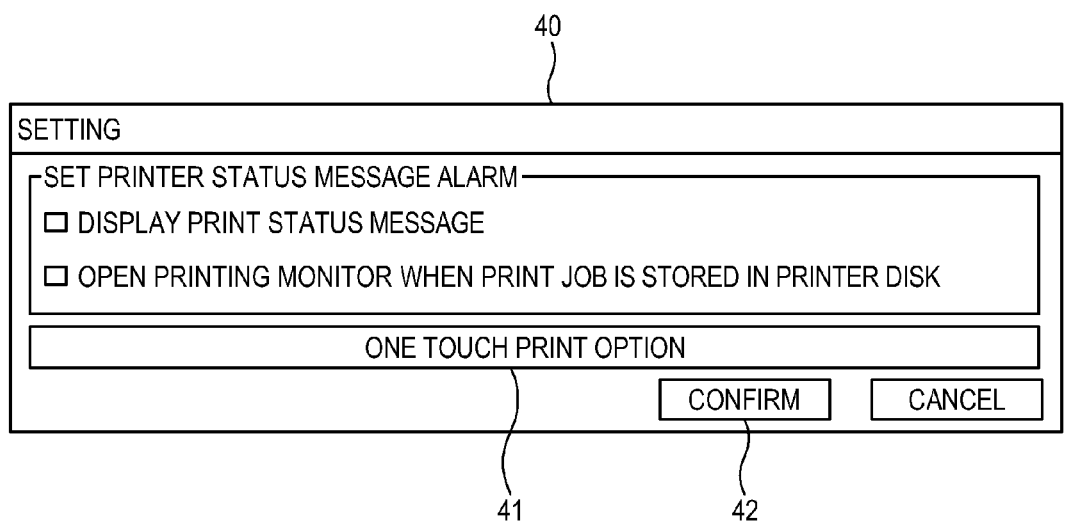
FIGS. 4 to 6 illustrate an example of a user interface (UI) to set a one touch print option.
Figure 5:
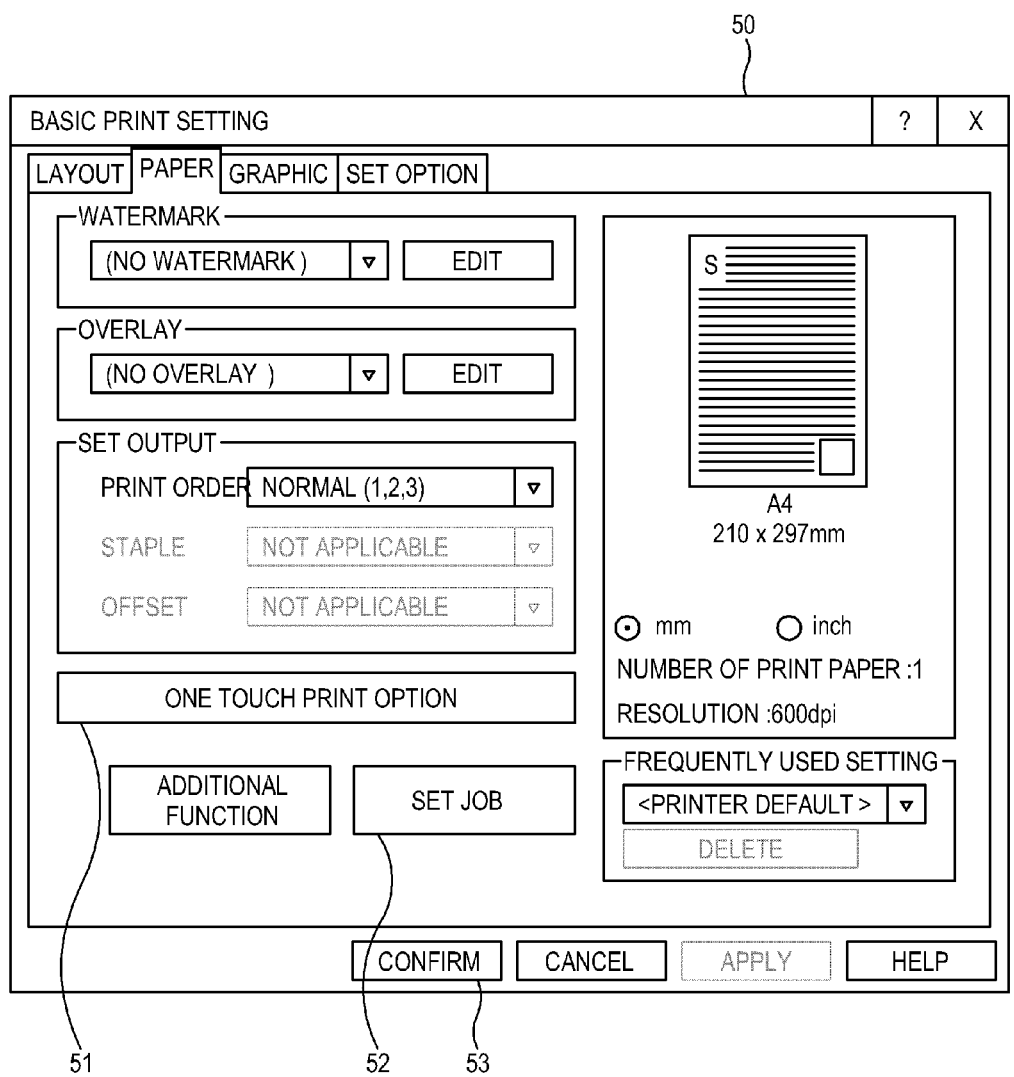
Figure 6:
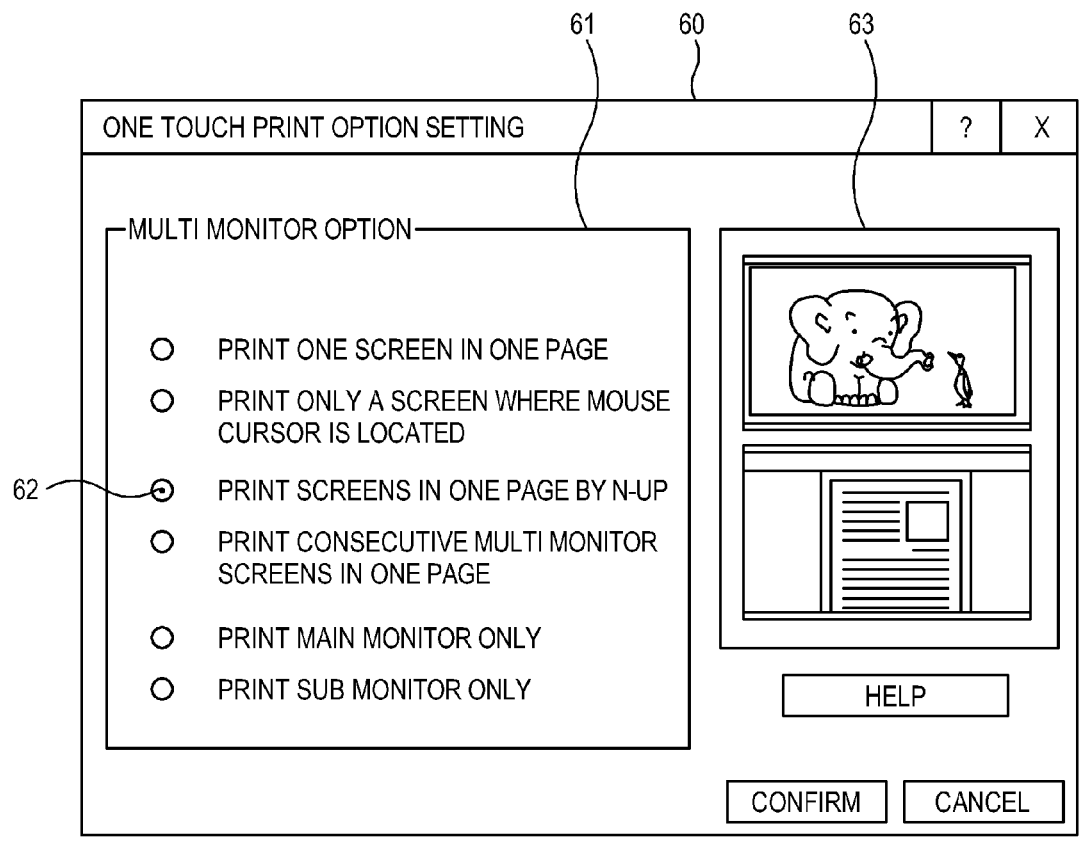

FIGS. 4 to 6 illustrate an example of a UI to set the one touch print option.

The UI in FIGS. 4 to 6 may be located as a combo box in the application or the printer driver.

More specifically, if a user executes the application supporting the one touch print in the host apparatus 100, the first controller 170 controls the first display unit 120 to display thereon a UI 40 to set the one touch print option as in FIG. 4. The displayed UI includes a text 41 (or graphic, icon or the like) representing the setting of the one touch print option. A user may select a confirm button 42 from the UI 40 in FIG. 4 and set a specific option.

If the one touch print function is supported by the printer driver, a UI 50 in FIG. 5 may be displayed. The displayed UI includes a text 51 (or graphic, icon or the like) representing the setting of the one touch print option. A user may select a set job button 52 and a confirm button 52 from the UI 50 in FIG. 4 and set various options. A user may confirm the print settings by pressing the button 53.

If the setting of the one touch option is selected from the UIs 40 and 50 in FIG. 4 or 5, the first controller 170 controls the first display unit 120 to display the option setting UI 60 in FIG. 6. The option setting UI 60 may include a text 61 (or graphic, icon or the like) representing the option of the one touch print. A selection icon 62 may indicate which option is selected to print in the multi-monitor environment.

As shown in FIG. 6, the one touch print option which may be set for the host apparatus 100 may include at least one of printing a screen of one single monitor in one page, printing a screen only where a mouse cursor is located, printing screens in one page by N-Up, printing consecutive images in one single page, printing a main monitor only, and printing a sub monitor only.

The option may be preset by a user or an administrator, and an option (e.g., print a screen of one single monitor in one page) may be set as a default without any setting process. A preview of the selected option may be illustrated in a preview window 63.

Other various options may be added or the options in FIG. 6 may be deleted as needed by a user or an administrator.

The option "print a screen of one single monitor in one page" means print one screen per page. For example, in the case of a dual monitor, a screen of the main monitor 121 is printed in one page and a screen of the sub monitor 122 is printed in one page. Thus, a total of two print media are output by a printing device, such as the image forming apparatus 200. The first controller 170 stores data of the monitor screens in additional image buffers, respectively.

The first controller 170 controls the image processor 130 to sequentially scale the screen data stored in the first and second image buffers 141 and 142 according to the size of the print medium and generate the print data.

The option "print a screen only where the mouse cursor is located" means print a screen of the monitor where the mouse cursor is located at the time of receiving the one touch print command. Accordingly, the screen of the monitor where the mouse cursor is located is printed in one page, and a total of one print medium is output from the image forming apparatus 200.

If the option is set to print only the screen where the mouse cursor is located, the first controller 170 identifies coordinates of a mouse pointer and acquires screen data of the monitor where the coordinates are located, and stores the screen data in a single memory buffer.

The option "print screens in one page by N-Up" means print a plurality of screens corresponding to a plurality of monitors in one page by N-Up. For example, in the case of a dual monitor, the first controller 170 stores two monitor screens in the first image buffer 141 and the second image buffer 142, respectively, and controls the image processor 130 to scale the image data stored in the plurality of image buffers into the same size and to generate a final image forming the two images in one page. The image processor 130 may scale a smaller image corresponding to a larger size, and may scale the scaled image into 1/n (n means the number of a plurality of monitors, and equals ½ in the case of a dual monitor), and may rotate a screen image as necessary to thereby generate the final image. Then, one print medium in which the screens of the main monitor 121 and the sub monitor 122 are printed in the same size is output from the image forming apparatus 200.

The option "print consecutive images in one single page" means print the plurality of screens corresponding to a plurality of monitors in one page by combining the screens according to resolution. In the case of a dual monitor, the first controller 170 stores the two monitor screens in the first image buffer 141 and the second image buffer 142, respectively, and controls the image processor 130 to scale the image data stored in the plurality of image buffers at a predetermined ratio, to form the image in one page, and to generate a final image. Then, one print medium in which the screens of the main monitor 121 and the sub monitor 122 are printed in the same size is output from the image forming apparatus 200.

The first controller 170 may control the image processor 130 to adjust a space arising from the difference of the size by adding white and output the print medium with a clear margin.

The option "print a main monitor only" and the option "print a sub monitor only" means selectively print the main monitor or the sub monitor according to a display setting value of the host apparatus 100, and one print medium in which the screen of the selected monitor is printed is output from the image forming apparatus 200.

Upon receiving the one touch print command, the first controller 170 stores in at least one of the image buffers 141 and 142 at least one of the plurality of image data corresponding to the screens of at least one of the monitors 121 and 122, and controls the image processor 130 to process the stored image data corresponding to the option and generate print data.

The processing of the image data includes scaling of the image according to the size of the print medium, rotating the image, adding space to the image or the like.

The image data are scaled to be the same as seen in the monitor and printed in a print medium without any editing process by a user.

The first controller 170 transmits the generated print data to the image forming apparatus 200 through the first communication unit 160.

Returning to FIG. 1, the image forming apparatus 200 includes a second user input unit 210, a second display unit 220, an image forming unit 230, a second storage unit 250, a second communication unit 260 and a second controller 270. If the image forming apparatus 200 includes a multi-function peripheral having two or more of functions, it may further include an image scanner to scan a document and generate scan data, and a fax unit to convert image data generated by the image scanner into a fax signal and transmit the fax signal to an external fax machine (including a multi-function peripheral having a fax function) or receive a fax signal from the external fax machine through a public switched telephone network (PSTN).

The second user input unit 210 receives data or a command from a user. The second user input unit 210 includes an input button provided in the image forming apparatus 200.

The second user input unit 210 may include a one touch print button 211 to receive a user's input for the one touch print function without difficulty.

If a user manipulates the one touch print button 211, the image forming apparatus 200 transmits the one touch print command to the host apparatus 100, and the host apparatus 100 selectively acquires the screens of the plurality of monitor according to the set option, processes the image and generates the print data.

A user may perform a log-in to the image forming apparatus 200 through the second user input unit 210. The second user input unit 210 receives user authentication information from a user for a log-in. The second controller 270 authenticates a user through the input user authentication information.

The second user input unit 211 includes a key button (hereinafter, to be also called hard key or key pad) provided in the image forming apparatus 200, and a graphic user interface (GUI) generated by an execution of a predetermined application and displayed on the second display unit 220 to receive a user's input by touch.

The second display unit 220 may include a liquid crystal display (LCD) panel and a driver to drive the LCD panel.

A user may set an option for the one touch print by using not only the host apparatus 100 but also the image forming apparatus 200.

That is, the second display unit 200 displays thereon a UI for each option as in FIG. 6, and a user selects the predetermined option from the displayed UI by touch to set the one touch print option.

The set option is transmitted to the host apparatus 100 through the second communication unit 260, and the host apparatus 100 processes the image according to the received option information and generates the print data.

As the option is set through the image forming apparatus 200, a user does not need to move between the image forming apparatus 200 and the host apparatus 100 to input the one touch print command and to set the option even if the host apparatus 100 and the image forming apparatus 200 are far from each other.

Upon receiving a print command, the image forming unit 230 forms an image to be printed on at least one print medium (paper) based on the print data. The print includes print of a scanned document for copying, print of received fax data, and print of print data received from the outside through the host apparatus 100 or stored in an inside (HDD) or outside (USB memory) of the image forming apparatus 200. The image forming unit 230 according to an exemplary embodiment includes a developing unit including an image carrier, a light scanning unit, a transfer unit, and a fusing unit.

The image forming apparatus 200 according to exemplary embodiments may include a single color image forming apparatus which forms an image by using a single color developer (generally black), a color image forming apparatus which forms a color image by using a four color developer, and a multi-color image forming apparatus which forms a color image by using an auxiliary developer such as a white developer in addition to the four color developer.

The second storage unit 250 may be memory that stores therein print data for print, fax data for fax transmission, image data scanned by an image scanner, data received from the host apparatus 100 or an external device including a server connected through the second communication unit 250, setting information of the image forming apparatus 200 through the second user input unit 210, and user authentication information for each user account and usage authorization information. The second storage unit 250 may further store therein fax data received from an external fax machine through a fax unit.

The second storage unit 250 may be an internal storage medium such as an HDD, or an external or portable storage medium such as a USB memory, a memory card (memory stick, CF card and MMC), and a memory card slot.

The second communication unit 260 performs a data communication with the host apparatus 100 and the external device including the server, and transmits the received one touch print command to the host apparatus 100, and receives print data in a predetermined print language from the host apparatus 100.

The second communication unit 260 may include a wired/wireless communication module which is connected to the external device such as the host apparatus 100 through the network by a predetermined protocol or a communication interface such as a USB device.

The second controller 270 controls the image forming apparatus 200 as a whole.

The second controller 270 controls the second communication unit 260 to load and transmit a one touch print command (including a command to store a screen) to the host apparatus 100 if the input of the one touch print button 211 is detected.

More specifically, the second controller 270 controls the second communication unit 260 to receive a signal identifying the reception of the input of the one touch print button 211 from the host apparatus 100 and identifies the input of the one touch print button 211 by an interrupt and returns the value. The second controller 270 controls the second communication unit 260 to transmit the one touch print command to the host apparatus 100 if the input of the one touch print button 211 is identified by the returned value.

The second controller 270 receives the print data corresponding to the one touch print option through the second communication unit 260 and controls the image forming unit 230 to perform a print operation.

Figure 1B:
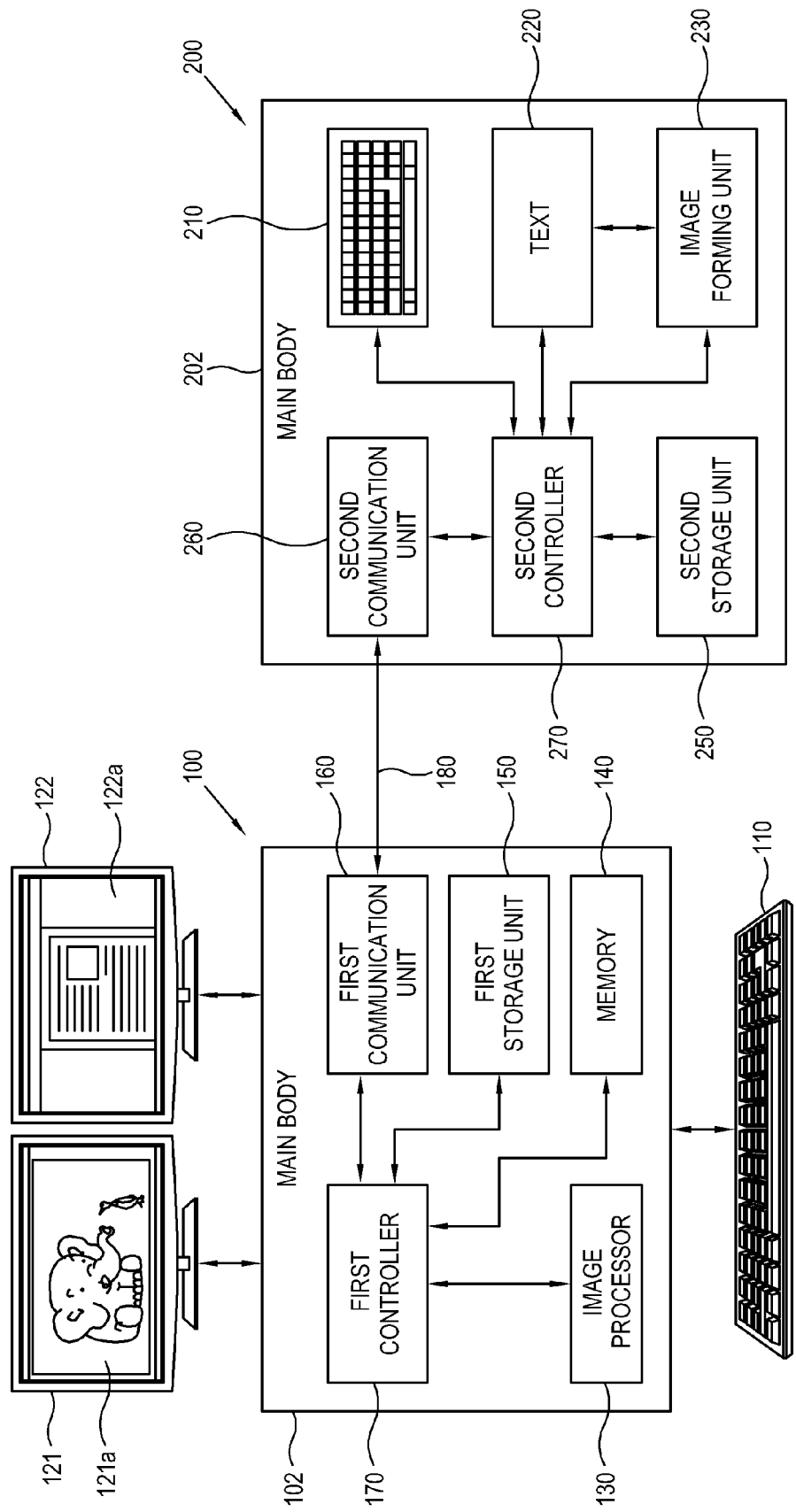
FIG. 1B illustrates block diagrams of a system including an image forming apparatus having a one touch print function according to an embodiment of the present general inventive concept.

FIG. 1B illustrates a block diagram of a physical structure of the image forming system according to an embodiment of the present general inventive concept. As illustrated in FIG. 1B, the host apparatus 100 may include a main body 102 that may be enclosed within a case, such as a personal computer tower or portable computer case. The first controller 170, image processor 130, first communication unit 160, first storage unit 150, and memory 140 may all be located within the main body 102. The first user input unit 110 may be located outside the main body 102. For example, the first user input unit 110 may be a keyboard connected to the main body via a wire or wirelessly. Alternatively, the first user input unit 110 may be integral with the main body 102, such as a touch screen.

The main monitor 121 and sub monitor 122 may be separate from the main body 102 and connected to the main body via wires or wirelessly to receive display data from the main body 102. The main monitor 121 may include a first display area or screen 121a and the sub monitor may include a second display area or screen 122a. According to an alternative embodiment, one of the multiple display areas 121a and 122a may be located on or in the main body 102. For example, if the main body 102 is a laptop or tablet, the display 121a may be part of the main body 102 and the sub monitor 122 may be connected to the main body 102 via a wire or wirelessly.

The image forming apparatus 200 also includes a main body 202, such as a case or outer shell. For example, if the image forming apparatus 200 is a printer, the printer may have an outer cover or case with sections to receive paper and to output paper. The second communication unit 260, second controller 270, second storage unit 250, and image forming unit 230 may all be located within the main body 202 of the image forming apparatus 200. The second display unit 220 and second user input unit 210 may each be located on the main body 202. For example, the second user input 210 may be a keypad or keyboard, and the second display unit may be an LCD screen.

The main body 102 of the host apparatus 100 may be connected to the main body 202 of the image forming apparatus 200 via a wire 180 or wireless connection.

Hereinafter, a print method of the host apparatus 100 and the image forming apparatus 200 by the one touch print will be described with reference to FIGS. 7 and 8.

Figure 7:
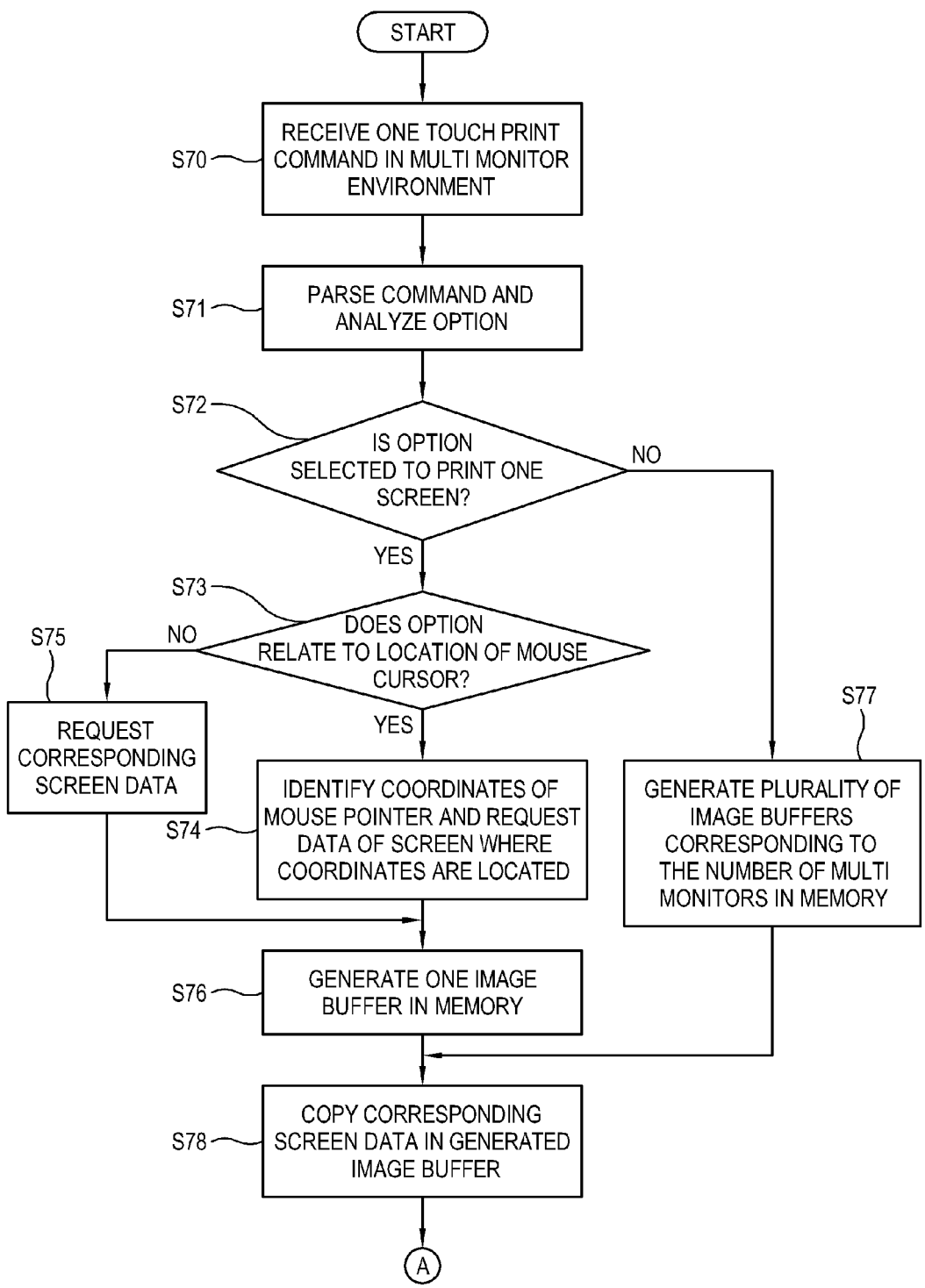
FIGS. 7 and 8 are flowcharts of a print method according to the exemplary embodiment.
Figure 8:
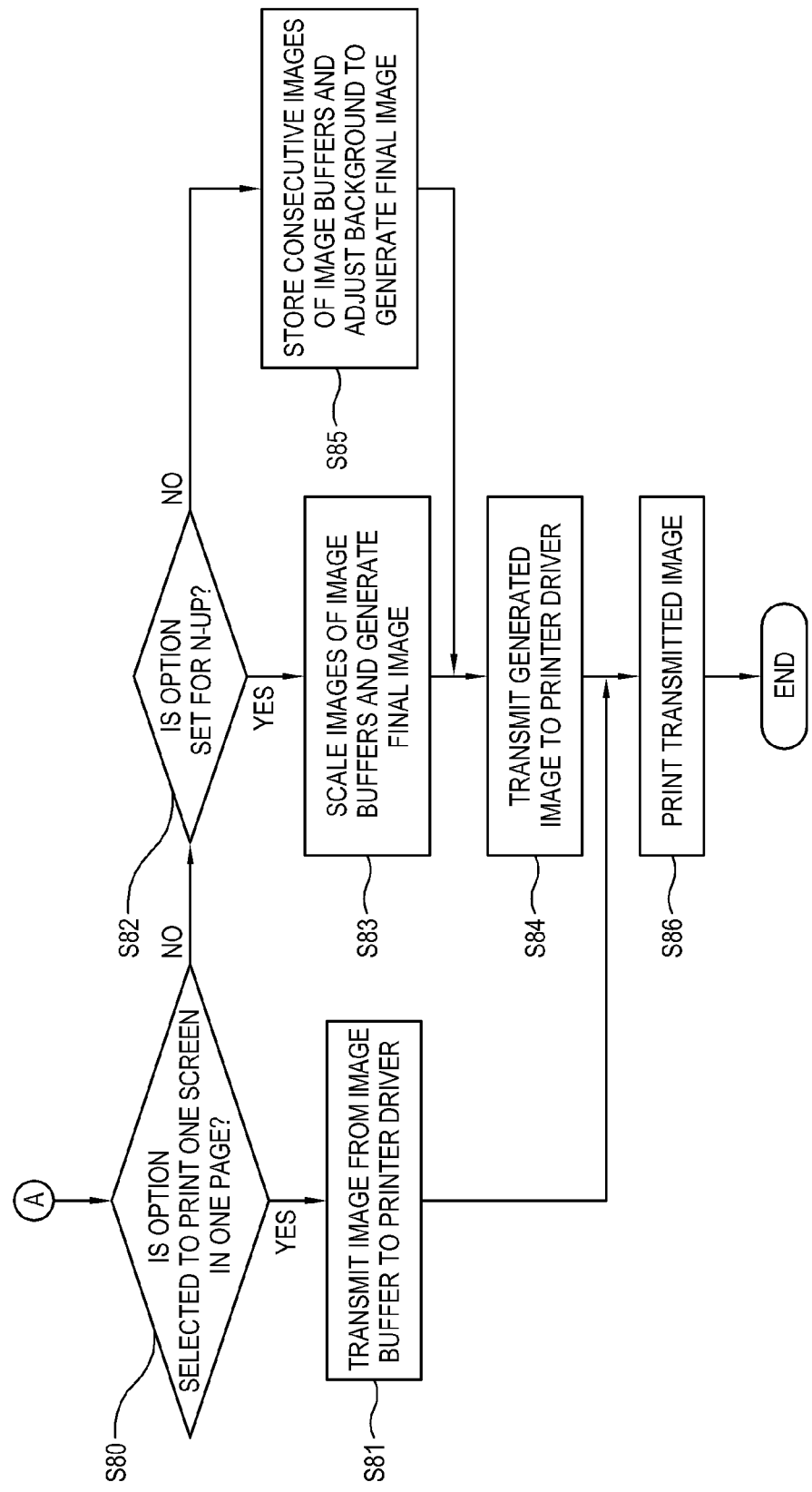

FIGS. 7 and 8 are flowcharts of a print method according to an exemplary embodiment.

As shown in FIG. 7, the image forming apparatus 200 connected to a host apparatus 100 that is in turn connected to a plurality of monitors may detect the input of the one touch print button 211 and receive the one touch print command in operation S70. The image forming apparatus 200 transmits the received one touch print command to the host apparatus 100.

The host apparatus 100 parses the command and identifies the one touch print command and analyzes the option set for the one touch print in operation S71.

In operation S72, the host apparatus 100 may determine according the result of the analysis at operation S71 whether the command is an option printing the screen of one of the plurality of monitors or an option printing the image of all of the plurality of monitors. The option for printing the single screen may include at least one of printing the screen only where the mouse cursor is located, printing only the main monitor screen, and printing only the sub monitor screen. The option for printing the image of all of the plurality of monitors may include at least one of printing a screen of one single monitor in one page, printing screens in one page by N-Up, and printing consecutive images in one single page.

If it is determined at operation S72 that the option includes the print only one screen, it may be determined whether the option is print only the screen where the mouse cursor is located in operation S73.

If the option relates to the location of the mouse cursor at operation S73, the first controller 170 identifies the coordinates of the mouse pointer and requests the screen data of the monitor where the coordinates are located in operation S74.

If the option does not related to the location of the mouse cursor at operation S73, the first controller 170 requests the screen data of the corresponding single monitor in operation S75.

A single memory area, i.e., a single image buffer, is generated in the memory 140 in operation S76.

If the option is to print the image of all of the plurality of monitors at operation S72, the plurality of memory areas, i.e., the plurality of image buffers corresponding to the respective monitors, is generated in the memory 140 in operation S77.

The image buffers which are generated at operation S76 or S77 store therein the screen data of the corresponding monitors in operation S78. The single image buffer stores therein the image data of the single monitor screen. That is, if one image buffer is generated, the screen data of a single monitor selected for the option is stored in the image buffer. If the plurality of image buffers is generated, the screen data of the monitors is stored in the corresponding image buffers, respectively.

According to the analysis results at operation S71, the first controller 170 may determine in operation S80 whether the option corresponds to printing the single monitor screen in one page. The option for printing the single monitor screen in one page may include at least one of printing one page per monitor screen, printing the screen where the mouse cursor is located, printing the main monitor screen only, and printing the sub monitor screen only.

If it is determined at operation S80 that the option is print the single screen in one page, the screen image is transmitted from the image buffers to the printer driver and the print data are generated in operation S81. If the option is print one monitor screen in one page, the data stored in the plurality of image buffers are sequentially transmitted to generate two print data. If the option is print only the screen where the mouse cursor is located, print the main monitor screen only or print the sub monitor screen only, one print data may be generated with respect to the data stored in the single image buffer.

At operation S81, the image processor 130 may scale or rotate the screen data to be printed in a print medium without any distortion like a defect of screen data.

If the option is determined to correspond to printing the plurality of monitor screens in one page, it may be determined in operation S82 whether such option corresponds to printing the screens in one page by N-Up or printing consecutive images in one page.

If the option corresponds to printing the screens by N-up at operation S82, the host apparatus 100 scales the images stored in the image buffers into the same size and generates the final image forming the images in one page by N-Up in operation S83. The process of generating the final image may be performed by the application or the printer driver supporting the one touch print function, including rotating the image.

The final image generated at operation S83 is transmitted to the printer driver and converted into print data in a print language in operation S84.

If the option is determined to correspond to printing the consecutive images in one page, the host apparatus 100 consecutively stores the images stored in the image buffers according to monitor resolutions, i.e., size, and adjusts the images to print the space in white (e.g. by changing the background to a white color) and generates the final image in operation S85.

The final image generated at operation S85 is transmitted to the printer driver and converted into the print data in a print language in operation S84.

The print data converted at operation S81 or S84 is transmitted to the image forming apparatus 200, which prints the received print data in operation S86.

With the foregoing process, a user may simply inputs his/her command through the one touch print button 212 of the image forming apparatus 200, and the screen data of the plurality of monitors is printed according to various options without difficulty.

Also, various options are provided and usability of the one touch print function improves.

Figure 9A:
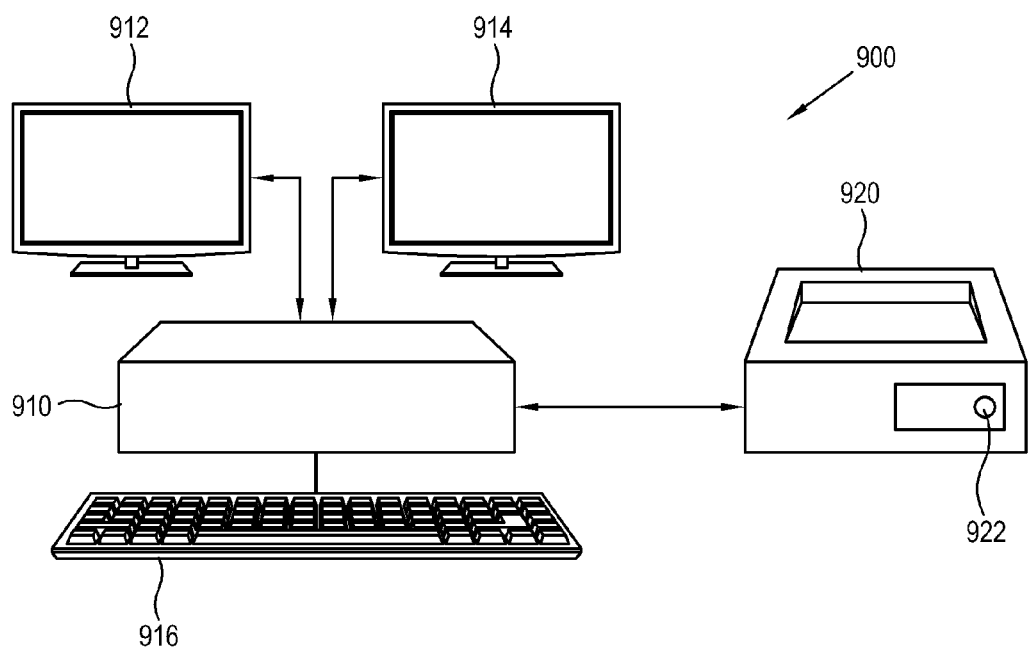
FIGS. 9A to 9C illustrate embodiments of systems including image forming apparatuses having a one touch print function according to the present general inventive concept.
Figure 9B:
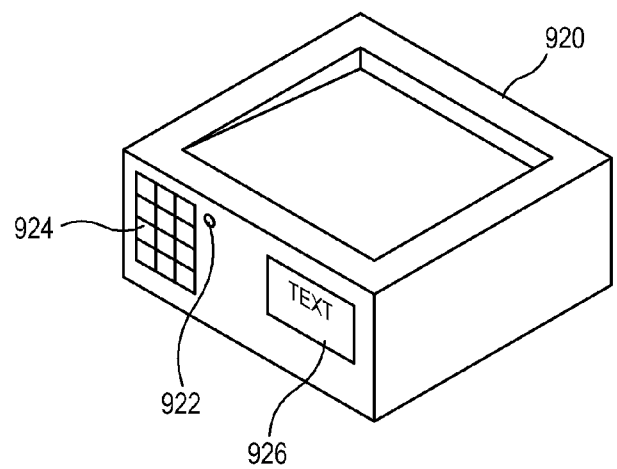
Figure 9C:
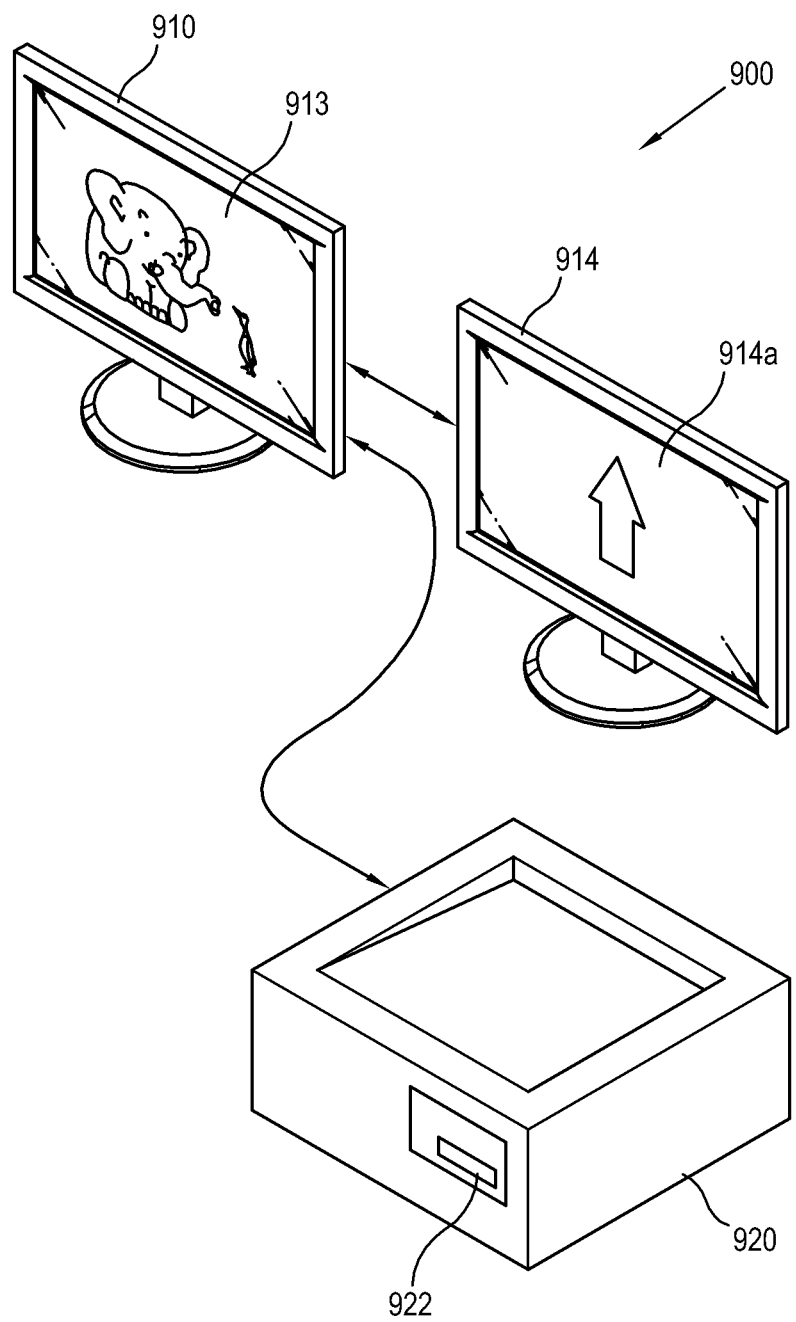

FIGS. 9A to 9C illustrate examples of image forming systems according to embodiments of the present general inventive concept. FIG. 9A illustrates an image forming system similar to that described in FIGS. 1A and 1B, above. The system 900 includes a main body 910 of a host apparatus, such as a personal computer tower, first and second monitors 912 and 914 connected to the main body 910 to display images according to data received from the main body 910, and a user input 916 such as a keyboard to control operation of the main body 910. The main body 910 of the host apparatus is separated from the image forming apparatus 920 and is connected to the image forming apparatus via a wire or wirelessly. The image forming apparatus 920 includes at least one button that provides for one touch printing of data displayed on at least one of the monitors 912 and 914.

FIG. 9B illustrates an image forming apparatus 920 having the one touch printing button 922 that is a hard button, or a physical button located on a surface of the image forming apparatus 920. The one touch printing button 922 is separated from the display 926, and may be part of a user interface 924, for example.

FIG. 9C illustrates an example of an image forming system 900 in which a first display 913 is located in the main body 910 of the host apparatus. A second monitor 914 having a second display 914a may be separated from the main body 910 and may be connected to the main body 910 via a wire or wirelessly. The main body 910 of the host apparatus may be connected to the image forming apparatus via a wire or wirelessly.

With reference to FIG. 1A, although embodiments have been described in which the first controller 170 determines whether to generate print data corresponding to only one monitor from among the main monitor 121 and the sub monitor 122, the second controller 270 may determine such settings. For example, default settings may be stored in the second storage unit 250, or a user may input settings in the second user input unit 210, to indicate whether, upon pressing the one touch print button 211, a command will be generated to print only one screen corresponding to the main monitor 121 or the sub monitor 122, or whether to print both screens corresponding to the main monitor 121 and the sub monitor 122. The second controller 270 may send a command including the predetermined settings to the host apparatus 100 via the second communication unit 260.

As described above, an image forming apparatus, a host apparatus and a print method thereof according to an exemplary embodiment stores data of a single monitor screen in a single image buffer generated in a memory to store therein data of multi monitor screens, and prints high quality output products without any image distortion due to a difference in resolution upon receiving a one touch print command in the multi monitor environment.

An image forming apparatus, a host apparatus and a print method thereof according to another exemplary embodiment provides selectable options for a one touch print to thereby improve usability and user's convenience.

An image forming apparatus, a host apparatus and a print method thereof according to another exemplary embodiment allows a user to input a one touch print command and to set an option for a one touch print from both a host apparatus and an image forming apparatus if the host apparatus and the image forming apparatus are far from each other.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A print method of a system comprising a host apparatus and an image forming apparatus, the host apparatus comprising a plurality of separate stand-alone monitors, the print method comprising:
   setting an option of a one touch print function to print image corresponding to a screen of one of the plurality of monitors in one page or to print a plurality of images corresponding to screens of all of the plurality of monitors in one or more pages based on the option to be identical as seen in the monitor;
   receiving a one touch print command by manipulating a one touch print button provided in the image forming apparatus, the one touch print command comprising a command to store at least one image of at least one monitor screen corresponding to the set option;
   generating at least one image buffer in a memory of the host apparatus to store therein image data corresponding to the screen of the at least one monitor according to the set option in response to receiving the one touch print command from the image forming apparatus;
   storing, in response to the received one touch print command, image data of the at least one monitor screen in at least one generated image buffer, one image buffer of the at least one image buffers storing image data of a single monitor screen;
   generating print data at the host apparatus by processing the stored image data corresponding to the option;
   printing the print data by the image forming apparatus.

2. The print method according to claim 1, wherein setting the option of the one touch print function includes one of setting an option to print an image corresponding to one screen of one monitor from among the plurality of monitors, and an option to print a plurality of images corresponding to all of the screens of the plurality of monitors.

3. The print method according to claim 2, wherein the generating the at least one image buffer comprises generating a plurality of image buffers in the memory corresponding to the plurality of monitors, respectively; and the storing the image data comprises storing the screen data of the plurality of monitors in the plurality of image buffers if the option is set to print the images of all of the plurality of monitors.

4. The print method according to claim 1, wherein setting the option comprises at least one of setting the option to print one monitor screen in one page, to print only a screen where a mouse cursor is located from among a plurality of screens corresponding to the plurality of monitors, to print screens in one page by N-Up, to print consecutive images in one page, to print a main monitor screen only, and to print a sub monitor screen only.

5. The print method according to claim 4, further comprising displaying a user interface (UI) in the host apparatus or the image forming apparatus to select the option.

6. The print method according to claim 4, wherein the generating the print data comprises scaling the image data of the monitor screen corresponding to a size of a print medium according to the option.

7. The print method according to claim 6, wherein the scaling comprises scaling the plurality of images corresponding to the plurality of monitor screens into a size of 1/n if the option is set to print the screens in one page by N-Up (wherein n means the number of the plurality of monitors).

8. The print method according to claim 4, further comprising adjusting the image to print a space in white if the option is set to print consecutive images in one page.

9. The print method according to claim 4, wherein the generating the print data further comprises rotating the image data according to the option.

10. The print method according to claim 4, wherein the storing the image data comprises identifying coordinates of a mouse pointer if the option is set to print only the screen where the mouse cursor is located; and
storing image data of a monitor screen where the identified coordinates are located in the image buffer.

11. A system comprising an image forming apparatus and a host apparatus comprising a plurality of separate stand-alone monitors, the image forming apparatus comprising:
an image forming unit which performs a print operation;
a communication unit which communicates with the host apparatus;
a user input unit which comprises a one touch print button to receive a one touch print command and which sets an option of a one touch print function to print image data from the plurality of monitor screens, the one touch print function printing image corresponding to a screen of one of the plurality of monitors in one page or printing a plurality of images corresponding to screens of all of the plurality of monitors in one or more pages based on the option to be identical as seen in the monitor, the one touch print command comprising a command to store at least one image of at least one monitor screen corresponding to the set option; and
a controller which controls the communication unit to generate and transmit to the host apparatus the one touch print command in response to manipulating the one touch print button,
wherein the host apparatus generates at least one image buffer in a memory to store therein image data of the at least one monitor screen according to the set option in response to receiving the one touch print command from the image forming apparatus, stores, in response to the received one touch print command, image data of the at least one monitor screen in the at least one generated image buffer, and generates and transmits to the image forming apparatus the print data corresponding the set option, one image buffer of the at least one image buffers storing image data of a single monitor screen,
wherein the controller receives the print data comprising the image data of the at least one monitor screen according to the set option from the host apparatus, and controls the image forming unit to print the received print data.

12. A system comprising a host apparatus and an image forming apparatus, the host apparatus comprising a plurality of separate stand-alone monitors,
the image forming apparatus comprising:
an image forming unit which prints image data received from the host apparatus;
a first communication unit which communicates with the host apparatus;
a first user input unit which comprises a one touch print button to receive a one touch print command to print image corresponding to a screen of one of the plurality of monitors in one page or to print a plurality of images corresponding to screens of all of the plurality of monitors in one or more pages based on an option of an one touch print function to be identical as seen in the monitor, the one touch print command comprising a command to store at least one image of at least one monitor screen corresponding to the set option; and
a first controller which controls the communication unit to generate and transmit to the host apparatus the one touch print command in response to manipulating the one touch print button,
the host apparatus comprising:
a second user input unit which is provided to set the option of the one touch print function to print an image of at least two monitor screens from among the plurality of monitors;
a second communication unit which receives the one touch print command from the image forming apparatus;
a memory which comprises at least one image buffer to store therein an image of the at least one monitor screen;
an image processor which generates print data; and
a second controller which generates the at least one image buffer in the memory to store therein the image of the at least one monitor screen according to the set option in response to receiving the one touch print command from the image forming apparatus, which stores, in response to the received one touch print command, image data of the at least one monitor screen in the at least one generated image buffer, and which controls the image processor to process the stored image data corresponding to the option and to generate print data,
wherein one image buffer of the at least one image buffers stores image data of a single monitor screen.

13. The system according to claim 12, wherein the option is set to print an image of one of the plurality of monitor screens or to print a plurality of images corresponding to all of the plurality of monitor screens.

14. The system according to claim 13, wherein the second controller generates a plurality of image buffers in the memory corresponding to the plurality of monitors and stores data of the plurality of monitor screens in the plurality of image buffers, respectively, if the option is set to print the plurality of images corresponding to all of the plurality of monitor screens.

15. The system according to claim 12, wherein the host apparatus further comprises a display unit which displays thereon a user interface to select the option, and
the option comprises at least one of printing one monitor screen in one page, printing only a screen where a mouse cursor is located, printing screens in one page by N-Up, printing consecutive images in one page, printing a main monitor screen only, and printing a sub monitor screen only.

16. The system according to claim 15, wherein the image processor scales the image data of the monitor screen corresponding to a size of a print medium according to the option.

17. The system according to claim 16, wherein the image processor scales the plurality of images corresponding to the plurality of monitor screens into a size of 1/n if the option is set to print screens in one page by N-Up (wherein n means the number of a plurality of monitors).

18. The system according to claim 15, wherein the image processor adjusts the image to print a space in a white color if the option is set to print consecutive images in one page.

19. The system according to claim 15, wherein the image processor rotates the image data according to the option.

20. The system according to claim 15, wherein the second controller identifies coordinates of a mouse pointer and stores image data of a monitor screen where the identified coordinates are located, in an image buffer if the option is set to print only a screen where a mouse cursor is located.

21. An image forming apparatus, comprising:
an image forming unit to generate an image onto a printing medium;
a communication unit including a port to communicate with a host device including a plurality of separate stand-alone monitors; and
a user interface to receive user input to print a plurality of screens corresponding to all of the plurality of monitors to be identical as seen in the monitors with the image forming unit,
wherein the user input includes one of a command to print the plurality of screens onto a same sheet of the printing medium and a command to print the plurality of screens on different sheets of the printing medium, such that both commands are performed by the user manipulating a one touch print button provided in the image forming apparatus that also causes a plurality of buffers to be created to store image data of the plurality of screens, a one touch print command received by manipulating the one touch print button comprising a command to store at least one image of at least one monitor screen corresponding to a preset option.

22. The image forming apparatus of claim 21, wherein the user interface includes a button to generate a command to print the screen of the plurality of monitors as seen in the monitor identically.

23. A host apparatus, comprising:
a plurality of separate stand-alone monitors to each display images thereupon;
at least one communication unit including a port to connect to a printing device;
a user input unit to receive setting information from a user; and
a controller to receive from the printing device via the at least one communication unit a command to print a screen of at least one monitor of the plurality of monitors to be identical as seen in the monitor, to generate print data corresponding to the screen of the at least one monitor, to determine whether to print the screen of only one of the plurality of monitors or to print the screens of all of the plurality of monitors based upon the received setting information, and to transmit the print data to the printing device via the at least one communication unit, such that the command is performed by the user manipulating a one touch print button provided in the image forming apparatus that also causes at least one buffer to be created to store image data of the at least one monitor, a one touch print command received by manipulating the one touch print button comprising a command to store at least one image of at least one monitor screen corresponding to a preset option.

24. The host apparatus of claim 23, wherein when the controller determines whether to print the screen of only one of the plurality of monitors, the controller further determines, based upon the received setting information, whether to print the screen of a predetermined monitor or to print the screen of a monitor corresponding to a location of a computer mouse icon.

25. The host apparatus of claim 23, wherein when the controller determines whether to print the screens of the plurality of monitors, the controller further determines, based upon the received setting information, whether to print the screens onto only one sheet of the printing medium or onto a plurality of sheets of the printing medium.

26. The host apparatus of claim 23, further comprising memory,
wherein the controller partitions only one image buffer in memory to store data corresponding to only one screen of the plurality of monitors when the controller determines to print only one screen, and
the controller partitions a plurality of image buffers in memory when the controller determines to print screens of all of the plurality of monitors.

27. A method of printing an image with an image forming apparatus and a host apparatus having a plurality of separate stand-alone monitors, comprising:
receiving a user input from a user at the image forming apparatus to print an image of a screen of at least one monitor of the plurality of monitors to be identical as seen in the monitor;
determining, upon receiving a command to generate the print data, whether to generate print data corresponding to only one screen of the plurality of monitors or to generate print data corresponding to each screen of the plurality of monitors, such that the command is performed by the user manipulating a one touch print button provided in the image forming apparatus that also causes at least one buffer to be created to store image data of the at least one monitor, a one touch print command received by manipulating the one touch print button comprising a command to store at least one image of at least one monitor screen corresponding to a preset option;
transmitting from the host apparatus the generated print data corresponding to the at least one monitor to the image forming apparatus; and
printing with the image forming apparatus the print data.

28. The method of claim 27, wherein when the host apparatus determines to generate the print data corresponding to only one screen of the plurality of monitors, the host apparatus further determines whether to generate print data corresponding to a predetermined screen of the plurality of monitors or to generate print data corresponding to a screen having a computer mouse icon.

29. The method of claim 27, wherein when the host apparatus determines to generate the print data corresponding to each screen of the plurality of monitors, the host apparatus further determines whether to generate print data to control the image forming apparatus to generate the print data of each screen onto a same sheet of a printing medium or onto separate sheets of the printing medium.

* * * * *